(12) United States Patent
Kay et al.

(10) Patent No.: US 11,184,071 B1
(45) Date of Patent: Nov. 23, 2021

(54) GROUND BASED BEAM FORMING WITH CLUSTERING

(71) Applicants: Stanley E. Kay, Rockville, MD (US); Uday R. Bhaskar, North Potomac, MD (US); Neal David Becker, Frederick, MD (US)

(72) Inventors: Stanley E. Kay, Rockville, MD (US); Uday R. Bhaskar, North Potomac, MD (US); Neal David Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/247,224

(22) Filed: Dec. 4, 2020

(51) Int. Cl.
*H04B 7/06* (2006.01)

(52) U.S. Cl.
CPC .................. *H04B 7/0617* (2013.01)

(58) Field of Classification Search
CPC .................................... H04B 7/0617
USPC ............................... 375/295, 299
See application file for complete search history.

(56) References Cited

U.S. PATENT DOCUMENTS

| 6,240,072 B1* | 5/2001 | Lo ............ H04B 7/2041 370/316 |
| 2005/0288011 A1* | 12/2005 | Dutta ........ H04B 7/18539 455/13.3 |

* cited by examiner

*Primary Examiner* — Fitwi Y Hailegiorgis
(74) *Attorney, Agent, or Firm* — Capitol City Techlaw; Jasbir Singh

(57) ABSTRACT

A system and method for beamforming includes providing an antenna including feeds, a coverage area including service areas and data streams for each of the service areas; scheduling N data streams of the data streams, selecting a cluster of M feeds from the feeds; computing, with a GBBF processor (ground based beam former), M×N weights; generating M feed excitations by distributing the N data streams per the M×N weights; switching an array to transfer a respective one of the M feed excitations to a respective one of the M feeds; and beamforming, with the M feeds of the antenna, N beams. In the method, the N beams are each focused on a respective service area of each of the N data streams, the M×N weights improve the transmitting into the respective service area of each of the N data streams, and at least one of the N beams includes a portion of a plurality of the M feed excitations.

20 Claims, 12 Drawing Sheets

| Fade depth, dB | C/N+I, dB | Reduction in C/N+I, dB |
|---|---|---|
| 0 | 18.20 | 0.00 |
| 1 | 17.39 | 0.81 |
| 2 | 16.55 | 1.65 |
| 3 | 15.68 | 2.52 |
| 4 | 14.79 | 3.42 |
| 5 | 13.87 | 4.33 |
| 6 | 12.94 | 5.26 |
| 7 | 12.00 | 6.21 |
| 8 | 11.04 | 7.16 |
| 9 | 10.08 | 8.12 |
| 10 | 9.11 | 9.10 |
| 11 | 8.13 | 10.07 |
| 12 | 7.15 | 11.05 |
| 13 | 6.17 | 12.04 |
| 14 | 5.18 | 13.03 |
| 15 | 4.19 | 14.02 |
| 16 | 3.19 | 15.01 |
| 17 | 2.20 | 16.00 |
| 18 | 1.20 | 17.00 |
| 19 | 0.21 | 18.00 |
| 20 | -0.79 | 18.99 |

GROUND BASED BEAM FORMING WITH CLUSTERING

FIELD

A system and method using on-board switched feed clusters for a system based on Ground-Based Beam Forming (GBBF). The on-board switching reduces GBBF feeder link requisites.

BACKGROUND

On-board beam forming direct radiating phased arrays are extremely difficult at Very High Throughput Satellite (VHTS) scales. VHTS on-board beam forming with array fed reflectors are somewhat more realizable, but still very complex. GBBF systems move the beam forming complexity to the ground where it is more easily handled. The roadblock to VHTS GBBF has been the feeder link bandwidth needed to support the very large number of feeds (antenna elements) on a VHTS. The very large number of feeds in the VHTS GBBF is impractical as the feeds need an enormous amount of bandwidth. Optical bandwidths can address this, but optical has its own set of challenges.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings systemically serve user terminals in a very High Throughput Satellite (VHTS) system via on-board switched feed clusters using Ground-Based Beam Forming (GBBF). The present teachings address the large required feeder link bandwidth of a GBBF system. A VHTS may have a large number of feeds, and it may be infeasible to provide enough feeder link bandwidth to address all the feeds at the same time. In the present teachings a subset of the feeds is used within any one time step (transmission interval) so that a limited amount of feeder link bandwidth suffices.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect for a method for beamforming includes providing an antenna including feeds, a coverage area including service areas and data streams for each of the service areas; scheduling N data streams of the data streams, selecting a cluster of M feeds from the feeds; computing, with a GBBF processor (ground based beam former), M×N weights; generating M feed excitations by distributing the N data streams per the M×N weights; switching an array to transfer a respective one of the M feed excitations to a respective one of the M feeds; and beamforming, with the M feeds of the antenna, N beams. In the method, the N beams are each focused on a respective service area of each of the N data streams, the M×N weights improve the transmitting into the respective service area of each of the N data streams, and at least one of the N beams includes a portion of a plurality of the M feed excitations.

The method where the antenna includes an array-fed reflector including more than the M feeds. The method where M is greater than N. The method where the M×N weights are weighted to account for a predicted offered traffic demand based on a usage pattern for each of the N data streams. The method where the scheduling, the selecting, the generating, the switching and the beamforming are performed per an integral multiple of a transmission interval. The method where the scheduling moves the N beams over a breadth of the coverage area over a plurality of transmission intervals. The method where the selecting includes a static mapping of clusters to a subset of service areas, where each subset includes N service areas and each subset includes uniformly spaced service areas. The method where the selecting selects feeds associated with a respective service area of one or more of the N data streams. The method may include forming the N data streams by encoding, modulating and framing each of the N data streams.

The method may include sending the M feed excitations to a satellite, where the switching and the beamforming are performed in the satellite, and the beamforming includes transmitting the N beams from the antenna. The method may include receiving the M feed excitations from a satellite, where the switching and the beamforming are performed in the satellite, and the beamforming includes receiving the N beams from the antenna. The method may also include where the M×N weights provide interference suppression so that a same frequency and polarization is used for the M feeds in the cluster. Other technical features may be readily apparent to one skilled in the art from the following figures, descriptions, and claims.

In one aspect, a system to beamform includes an antenna including feeds, a coverage area including service areas and data streams for each of the service areas, a Scheduler to schedule N data streams of the data streams and to select a cluster of M feeds from the feeds, a GBBF processor (ground based beam former), to compute M×N weights, a Complex Weight Multiplier to generate M feed excitations that distribute the N data streams per the M×N weights, and a switch to transfer a respective one of the M feed excitations to a respective one of the M feeds. In the system, N beams are beamformed with the M feeds of the antenna, the N beams are each focused on a respective service area of each of the N data streams, the M×N weights improve the transmitting into the respective service area of each of the N data streams, and at least one of the N beams includes a portion of a plurality of the M feed excitations.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
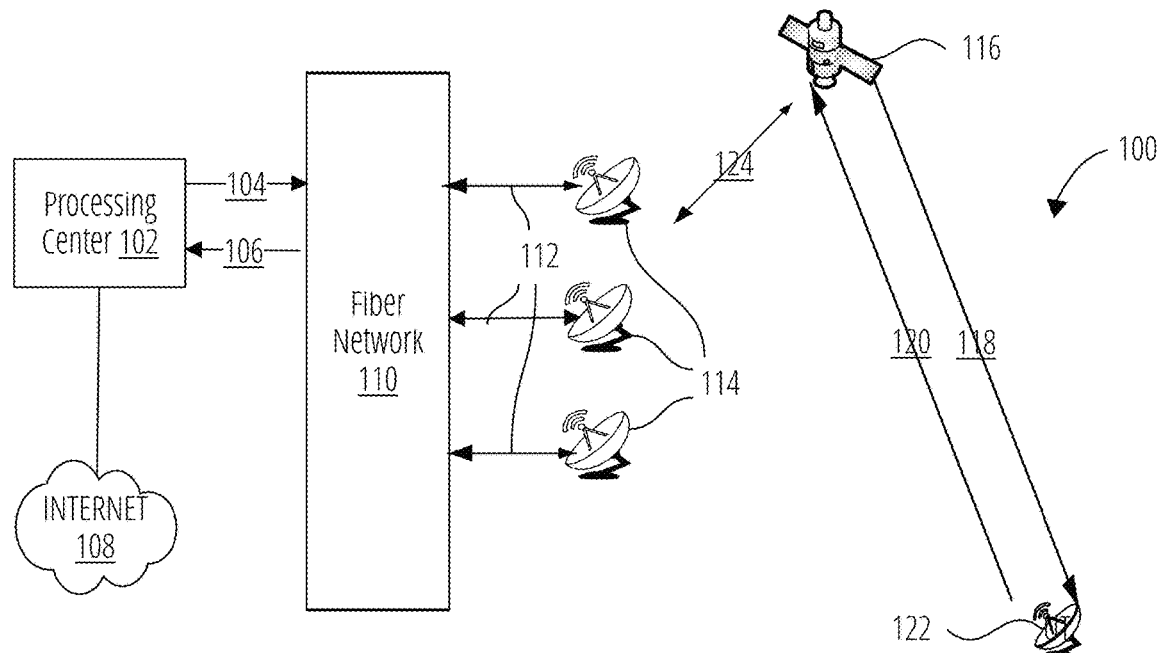
FIG. 1 illustrates a Very High Throughput Satellite (VHTS) system including Ground-Based Beam Forming (GBBF) according to various embodiments.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings systemically serve user terminals in a very High Throughput Satellite (VHTS) system via on-board switched feed clusters using Ground-Based Beam Forming (GBBF). In some embodiments, a feed may be an antenna element. As such, a feed pattern may be an element pattern. In some embodiments, a beam pattern may be a combination of feed patterns. A Beam pattern may be formed by applying different amplitudes and phases to the same beam signal to derive multiple feed signals in the forward downlink. This may be performed by multiplying a baseband signal by complex weights. The set of all multiplications is an M×N matrix with N beam inputs and M feeder link outputs. Thus, each beam signal goes to multiple feeder links and each feeder link signal comprises multiple beam signals. A beam pattern may be smaller than a feed pattern.

In some embodiments, a transmission interval or hop may be a time interval during which a specific set of beam patterns are formed. The set of beam patterns may change from one hop to the next, usually in an integral multiple of the transmission interval.

A Service area of a beam is the area in which users being served during a hop are located. The service area tends to be located near the peak of the beam. In other words, the size of the service area is small enough so that the directivity of the beam at the edge of the service area might be less than a dB reduced from the directivity of the beam at the center of the service area. In a traditional single feed per beam arrangement, 4 to 6 dB of directivity loss would be typical and the service area would be a much larger fraction of the beam area. A beam pattern may peak over a service area and have nulls over other service areas.

In some embodiments, on any hop, about 80-85 beam patterns are formed from the 99 selected feeds. They beam patterns serve about 80-85 service areas. According to various embodiments, the service areas have gaps between them and are not contiguous. Users located in the gaps cannot be served during that hop and wait their turn on a later scheduled hop. In some embodiments, during a hop, 99 feeds may be active. These feeds tend to be contiguous in the feed plane on the satellite. However, the feeds chosen during a hop are need not be contiguous. The non-contiguous feeds may be exception cases caused by scheduling demands, reserved beams, etc. Each feed receives a feed excitation signal from one of the feeder links from the processing center.

FIG. 1 illustrates a Very High Throughput Satellite (VHTS) system including Ground-Based Beam Forming (GBBF) according to various embodiments.

A VHTS system 100 including a Ground-Based Beam Forming (GBBF) processor 102 may be connected to the internet 108. In a forward direction 104 (for example, from internet-to-customer) data streams containing digital representations of the Feed excitations 124 are formatted for transmission over a Fiber Network 110. In some embodiments, in a return direction 106 (for example, from customer-to-internet) data streams containing digital representations of the Feed excitations 124 are formatted for transmission over the Fiber Network 110. A feed excitation is the signal that will be transmitted in a downlink 118 from a satellite 116 to a UT 122. The Feed excitation 124 is distributed via the Fiber Network 110 to a network of RF GWs 114 via links 112. The RF GWs 114 convert the digital baseband data of the feed excitation received over links 112 into RF signals and transmit them to a satellite 116. The satellite 116 converts the Feed excitations 124 to the forward downlink frequencies and routes the signals to a selected subset of feeds. These feed transmissions produce beam patterns as the downlinks 118 of the satellite 116 covering the UTs 122.

The present teachings differ from traditional "bent-pipe" forward satellite paths in that the processing center includes a GBBF. The satellite 116 includes an antenna and feed configuration suitable for use with a GBBF. The information transmitted to the RF GWs 114 (and the satellite 116) are feed excitations for transmission by the satellite 116 to the UTs 122, whereas in a bent pipe satellite information transmitted to the RF GWs 114 (and the satellite 116) would be beam signals.

The present teachings differ from a traditional GBBF in that the feed excitations are limited to a small subset of the total feeds on the satellite at any given time. This enables the satellite to support many feeds without a proportional increase in the bandwidth. The subset may form a contiguous "cluster" of feed where all the feeds are "touching". In one embodiment, the subset may form two or more groups of varying sizes. In some embodiments, a cluster may include not contiguous feeds, for example, to schedule outlier/latent feeds that did not scheduled. Restrictions and limitations on the subset are discussed below.

A satellite 116 may include an antenna (not shown) including feeds, for example, X feeds. One or more of the feeds may be activated at a time for transmission or reception. In one embodiment, M selected feeds out of the X satellite antenna feeds may be activated to service N beams (for reception or transmission) at a time.

Figure 2A:
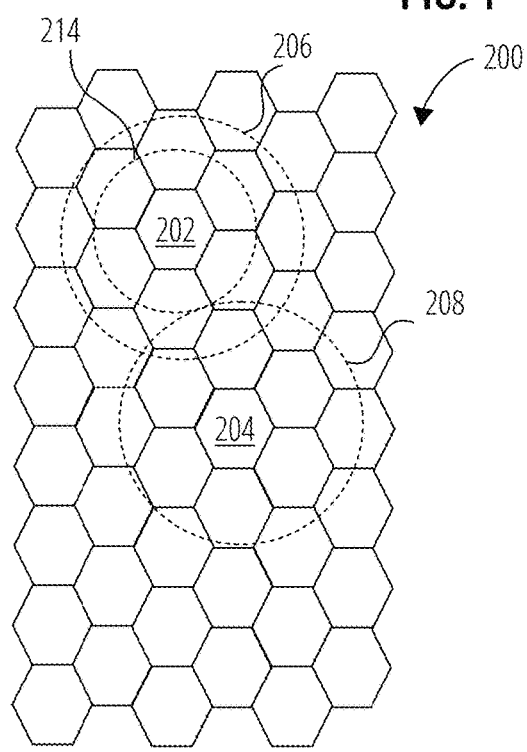
FIG. 2A illustrates a beam illumination for a coverage area according to various embodiments.

FIG. 2A illustrates a beam illumination for a coverage area according to various embodiments.

A coverage area 200 includes service areas. A service area 202 and a service area 204 may be serviced/illuminated during a transmission interval. Service area 202 and service area 204 are not contiguous. The remaining hexagons (service areas) of FIG. 2A may be served on different transmission intervals. The circle 206 and 208 may roughly correspond to the contour where the beam for the service area 202 and service area 204 has reduced by 6 dB or more. An exemplary circle 214 may correspond to the contour where the beam for the service area 202 has reduced by 3 dB or more.

A cluster of service areas may be illuminated by beams from a satellite (not shown) within the satellite's coverage area. Exemplary dimensions of the cluster may be in (U, V) coordinates as seen from a geostationary satellite. In some embodiments, a diameter of the circle 214 may be roughly the half-power beam width of a 5 m antenna at Q-band (40-42 GHz). The 5 m antenna may be a direct radiating array or an array-fed reflector. In some embodiments, the array-fed reflector may use far fewer active feeds than a direct radiating array. The feeder link bandwidth may be proportional to the number of active feeds.

Service areas may be spaced so that the same frequency and polarization can be used in the cluster during the same transmission interval using an interference suppression provided by the GBBF processor. The number of service areas in the cluster during a transmission interval depends on the number of feeds used in the cluster, the desired spectral efficiency, the traffic destined to the customer terminals within the service area, and other factors related to priority and efficiency. The service areas for a cluster on a given transmission interval may be uniformly spaced as shown or they may be more randomly distributed.

Figure 2B:
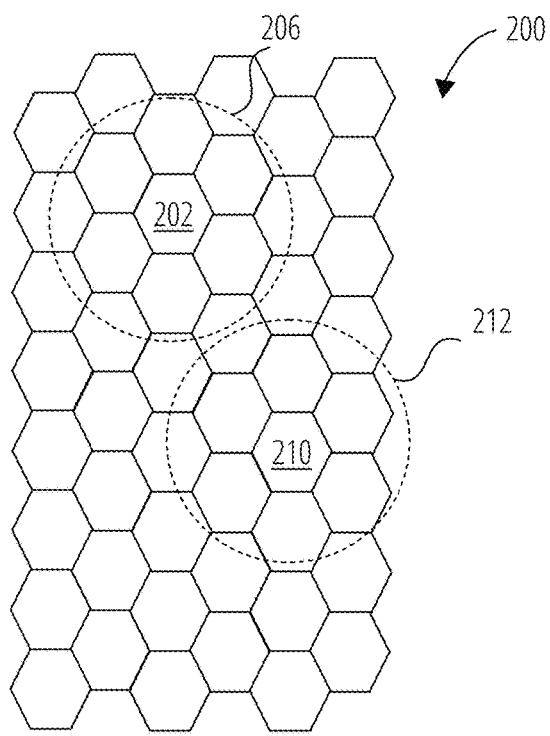
FIG. 2B illustrates a beam illumination for a coverage area according to various embodiments.

FIG. 2B illustrates a beam illumination for a coverage area according to various embodiments.

In some embodiments, the on-board switching may create $16^{99}$ combinations of clusters from the active feeds. Each combination is called a cluster. Only one combination is formed on each hop. Once a cluster of 99 feeds is chosen, the beam patterns are formed. Selecting a set of 99 feeds does not fully determine the beams or service areas. FIG. 2A and FIG. 2B differ by choosing one service area differently and moving the beam to cover that service area. The same set of 99 feeds may be used in both cases. In other words, the same cluster may serve different Service areas. For example, in FIG. 2B service area 202 and service area 210 may be served by the same cluster as service area 202 and service area 204 of FIG. 2A.

Figure 3A:
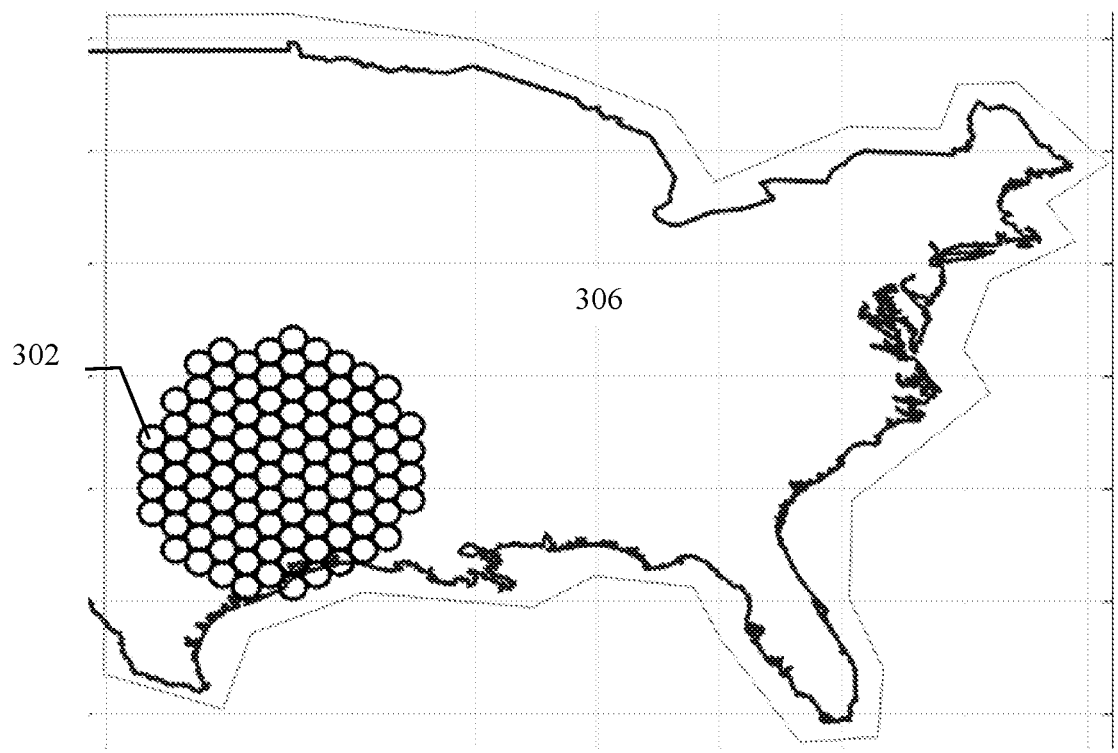
FIG. 3A illustrates a cluster aimed over a first location within a coverage area for a transmission interval according to various embodiments.

FIG. 3A illustrates a cluster aimed over a first location within a coverage area for a transmission interval according to various embodiments.

Figure 3B:
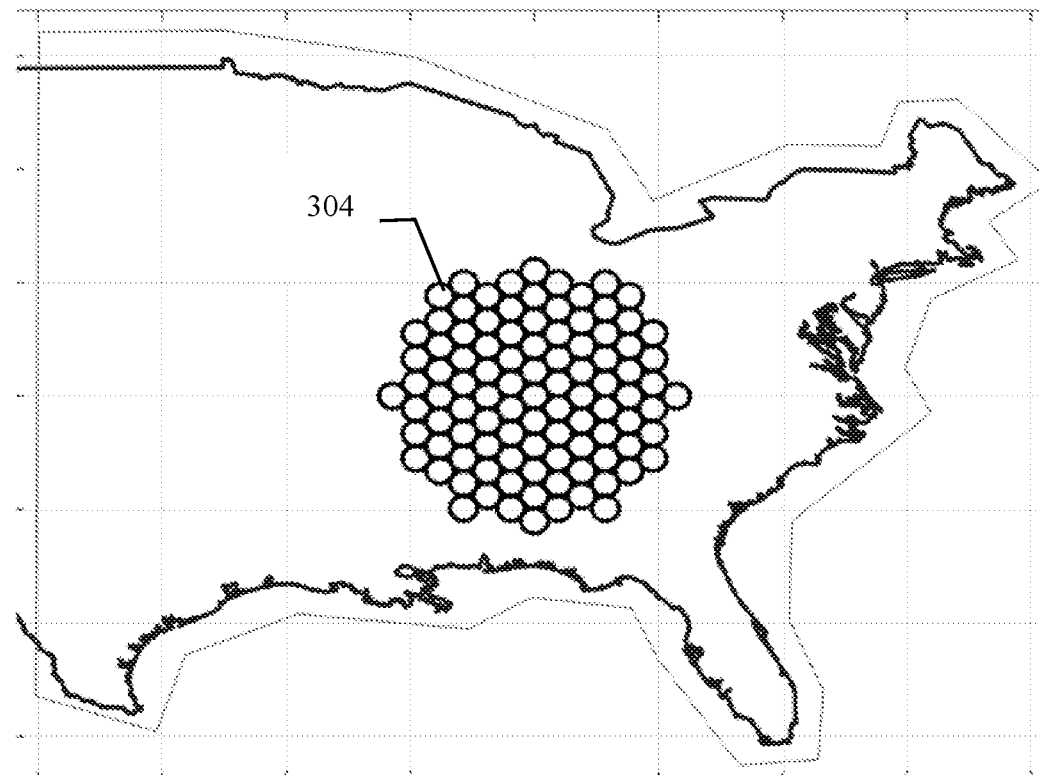
FIG. 3B illustrates a cluster aimed over a second location within a coverage area for a transmission interval according to various embodiments.

FIG. 3B illustrates clusters aimed over a second location within a coverage area for a transmission interval according to various embodiments.

FIG. 3A and FIG. 3B illustrate a coverage area 306 (here the eastern half of the continental United States), a first location 302 serviced by a cluster and a second location 304 serviced by a different cluster during two transmission intervals. The axes of FIG. 3A and FIG. 3B are in (U,V) coordinates for an antenna on a geostationary satellite with an antenna boresight at approximately 306. By moving a cluster, the coverage area can be serviced over a multiplicity of transmission intervals. In some embodiments, the service areas within a cluster may be moved (shifted) with or without moving the overall cluster. The shape of a coverage area need not produce circular clusters everywhere, for example, Florida in the United States. The set of feeds chosen for any individual transmit interval may be chosen to account for this. As noted previously, the clusters need not be contiguous.

Figure 4:
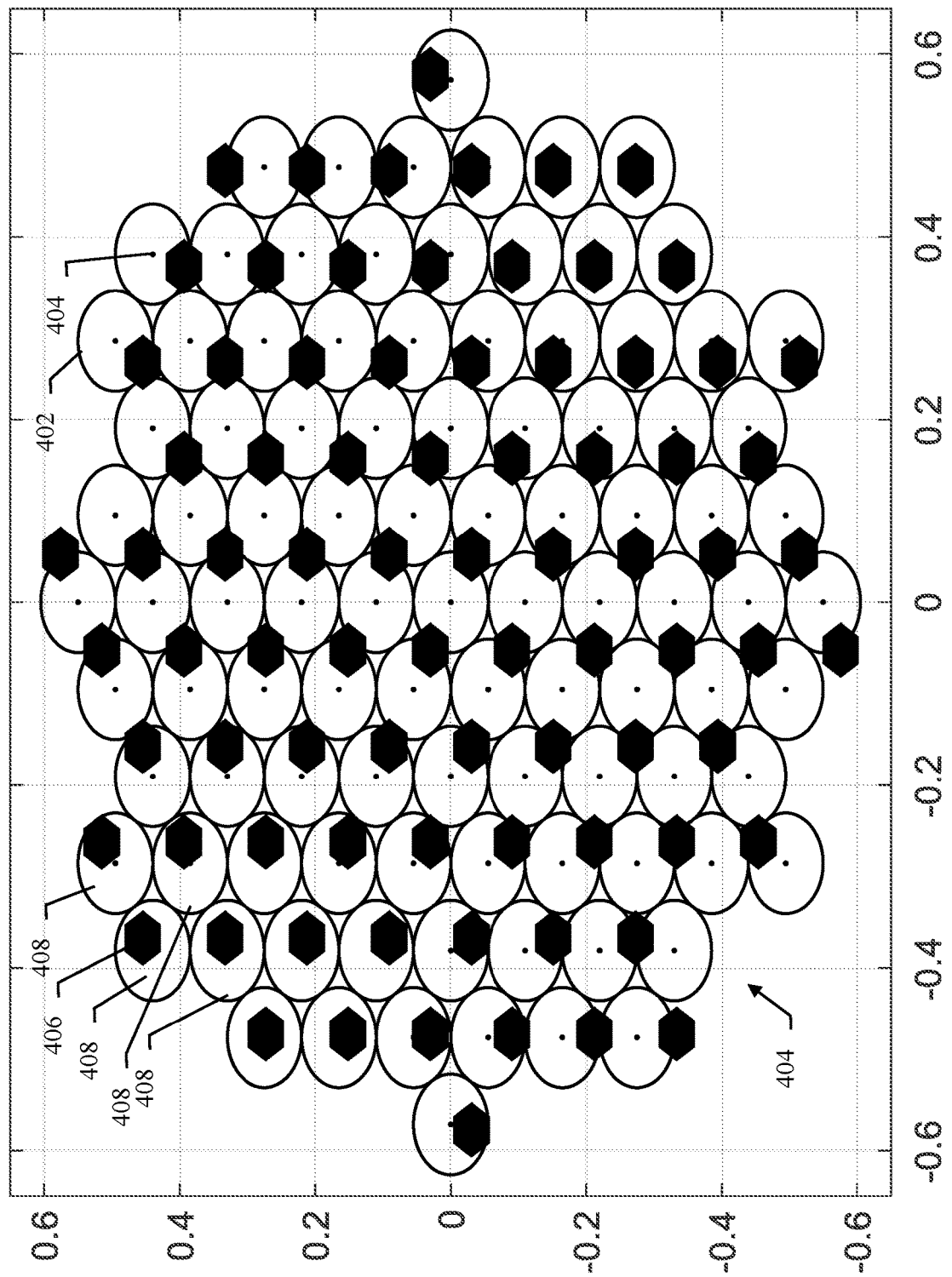
FIG. 4 illustrates a cluster and feeds according to various embodiments.

FIG. 4 illustrates a cluster and feeds according to various embodiments.

A cluster 400 may include feed secondary patterns 402. Each feed secondary pattern 402 may be associated with a feed and may have a corresponding center of secondary pattern 404. By convention, a secondary pattern is the illumination pattern formed on the surface of the earth by the energy transmitted by that feed after reflection off the satellite transmit antenna. The feed secondary pattern 402 is represented by a circle in FIG. 4 but the actual pattern may have a more arbitrary equal power contour.

One or more feed secondary patterns may combine to service a service area. For example, service area 82 406 may be combination of adjacent feed secondary patterns 408. Due to the combining of feed secondary patterns, the service areas do not have a fixed relationship to the centers of the secondary patterns. A GBBF computes the beam forming weights for each feed to improve the transmission into the service areas.

Processing Center

Figure 5:
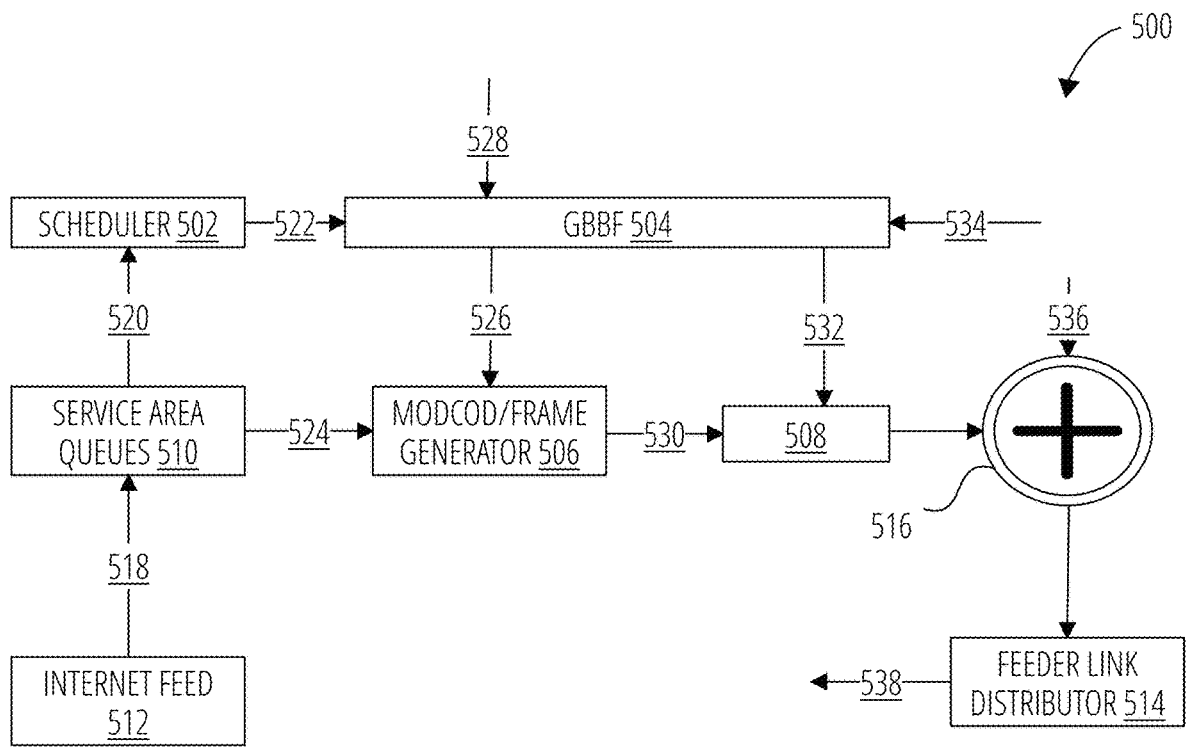
FIG. 5 illustrates a processing center according to various embodiments.

FIG. 5 illustrates a processing center according to various embodiments.

The processing center 500 for the forward direction includes a Scheduler 502, a GBBF 504, a Complex Weight Multiplier 508, service area queues 510, a Modcod/frame generator 506, an Internet feed 512, a Feeder link distributor 514 and a combiner 516. a data 518, a queue status 520, an N beams Metadata 522, an N beam data 524, an EsNo prediction 526, an EsNo Reports 528, an N beam superframes 530, a M×N Complex Weights 532, a Channel State 534, a Calibration Reference 536, and an M feed excitations 538.

Data 518 destined for the customer enters from the Internet feed 512 may be queued at a respective service area queue 510. In some embodiments, Internet feed 512 may be a 400 Gbps data rate feed for one polarization, for example, the right hand circularly polarized (RHCP). An additional Internet feed 512 may be handled in an identical and independent system generating LHCP data. Notionally, the processing center 500 could be a single site or one site for each polarization in the forward direction.

Data 518 is queued by service area each transmission interval. The system may be presumed to operate on a fixed transmission interval, sometimes referred to as a "hop". During each transmission interval, the Scheduler 502 examines the queue status per queue status 520 and determines which queues should be served. As in traditional queueing systems, the status may include the queue depth, information priority, and age of the packets. The teachings may include a location of the service areas, as the service areas may dictate the feeds to be used during this transmission interval. This process is described in more detail in the "Scheduling" section below.

Once the feeds and service areas have been selected, the GBBF 504 computes the beam weights using for example, minimum mean square error (MMSE) beam forming. To perform these calculations, the GBBF 504 uses N beams Metadata 522 and Channel State 534 the channel state information for each data path. This information may be generated by a calibration subsystem described in more detail in the "Calibration" section. The overall beam forming computations and processing is described in more detail in the "Beam Forming" section.

The GBBF 504 may have two outputs, namely, EsNo prediction 526 and M×N Complex Weights 532 ($w_{ij}$). EsNo prediction 526 predicts the link performance at each UT so that an appropriate modulation and coding (modcod) can be selected to assure correct delivery of the data to the customer. M×N Complex Weights 532 is the beam weights used in the beam forming computation.

Data is dequeued from the service area queues 510 as selected by the Scheduler 502 and validated by the GBBF 504. The system may operate with superframes, which may be constructed by computing the EsNo at each (presumed known) location to be served for ModCod assignment. The EsNo computing may be based on EsNo Reports 528 from UTs combined with the predictions from the MMSE beam forming computations. The Modcod/frame generator 506 forms codeblocks that will fit into a superframe for each selected service area queues 510.

Then M×N Complex Weights 532 $w_{ij}$ may be used by the Complex Weight Multiplier 508 to multiply the dequeued data streams i to form or feed excitations j. $f_j = \Sigma s_i w_{ij}$. The combiner 516 may inject a calibration underlay signal based on the Calibration Reference 536 (per-feed per-band) to each feed transmission to enable the calibration function mentioned above. The final step is to format this data appropriately for transmission over the links to the RF gateways using the Feeder link distributor 514 to generate the M feed excitations 538.

Fiber Network and Radio Frequency Transmitter

Figure 6:
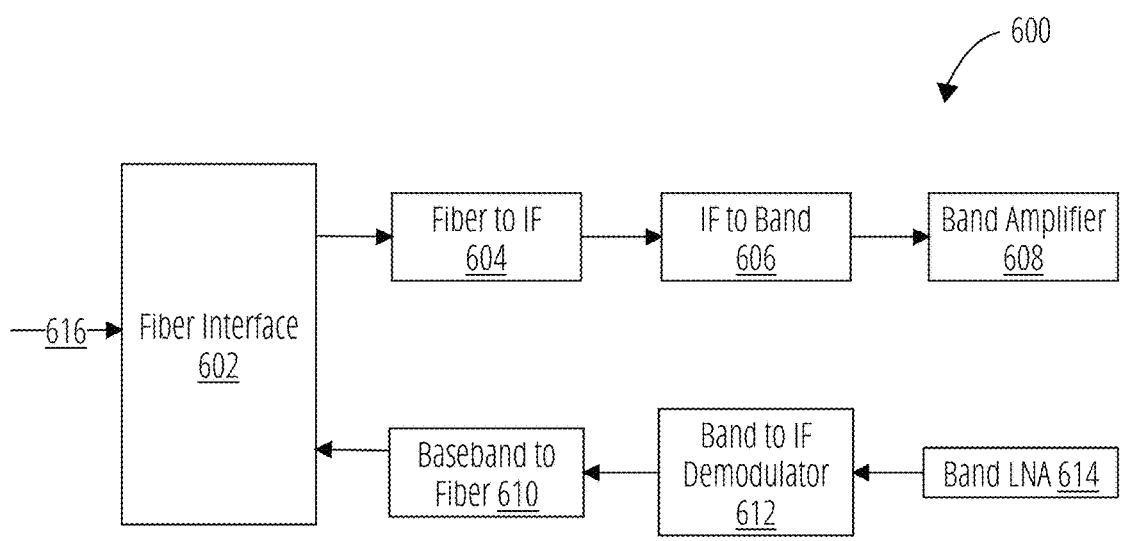
FIG. 6 illustrates a Radio Frequency Transmitter (RFT) site in accordance with one embodiment.

FIG. 6 illustrates a Radio Frequency Transmitter (RFT) site in accordance with one embodiment.

An RFT site 600 includes a fiber interface 602, a Fiber to IF 604, an IF to Band 606, a Band amplifier 608, a Baseband to fiber 610, a Band to IF Demodulator 612 and a band LNA 614. Data 616 formatted as a feed (for example, one of the M feed excitations 538 from the processing center 500 of FIG. 5) is received by the RFT site 600 for transmission to the satellite. Notionally, data 616 is communicated with the RFT site 600 over a redundant fiber network.

In the forward direction, data 616 from the fiber interface 602 is converted to a convenient intermediate frequency (IF), such as 6 GHz, at the Fiber to IF 604 block and then upconverted to the final RF frequency at the IF to Band 606 block (for example, V-band, E-band, or the like) which is transmitted by the Band amplifier 608. In the return direction, a reverse process is undertaken.

Satellite

Figure 7:
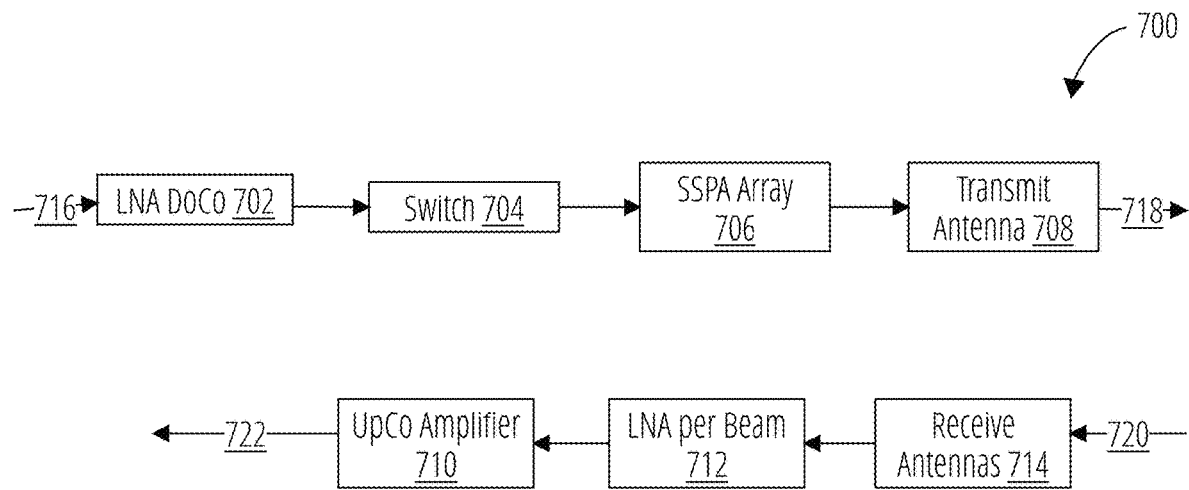
FIG. 7 illustrates a satellite block diagram in accordance with one embodiment.

FIG. 7 illustrates a satellite block diagram in accordance with one embodiment.

A satellite 700 comprises a low-noise amplifier (LNA) 702, a Switch 704, an SSPA Array 706, a Transmit Antenna 708, an up-converter Amplifier 710, an LNA per beam 712 and Receive Antennas 714. The satellite 700 receives a UL feeder link 716 from a RF GW which is output as a User DL 718. The satellite 700 receives a User UL 720 from a UT which is output as a DL feeder link 722.

The satellite 700 may be a passive beam former with a beam hopping capability. In the forward direction, in some embodiments, the UL feeder link 716 may be V-band (47-51 GHz) and E-band (81-86 GHz) uplinks that are converted to the User DL 718 for downlink transmission, for example, as Q-band (40-42 GHz) signals. In some embodiments, in the return direction, the User UL 720 may be Ka-band (28-30 GHz) and converted to E-band (71-76 GHz) for transmission to the RF GW as the DL feeder link 722. The conversions may be a single conversion directly from the uplink frequency to a corresponding downlink frequency or it may be a dual conversion, first to a convenient IF than back up to the downlink frequency. The satellite may incorporate a digital channelizer in the RF chain to allow frequency bands to be conveniently swapped for service reasons or to facilitate RFT site diversity. Each UL feeder link 716 is routed to the Switch 704 and then to the SSPA Array 706 and then the Transmit Antenna 708.

Figure 8:
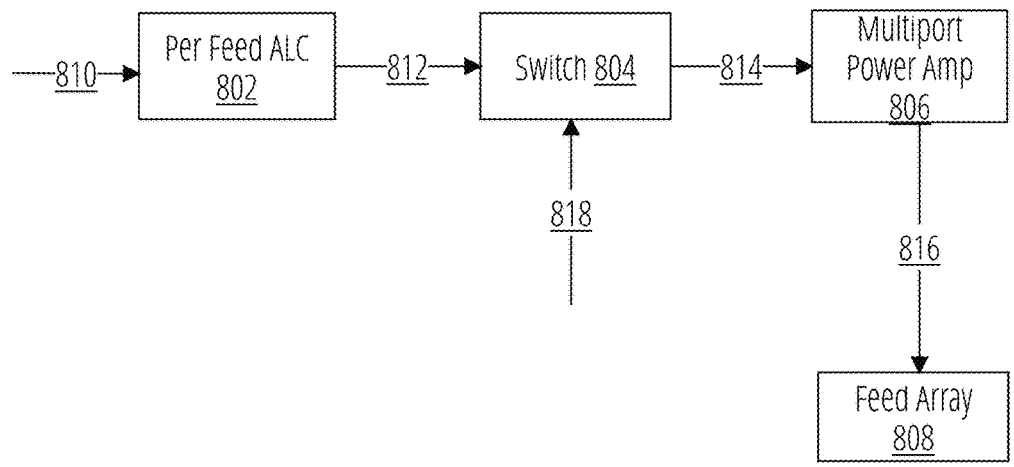
FIG. 8 illustrates an aspect of the subject matter in accordance with one embodiment.

FIG. 8 illustrates processing of forward direction feeder links at a satellite according to some embodiments.

The forward direction feeder links 810 at a satellite may include down conversion (for example, to the Q-band) including automatic level control (ALC) 802 to compensate for fading on the forward direction feeder links 810. The Switch 804 couples to a multiport power amplifier 806. Both the Switch 804 and MPA 806 are integral to implementing the clusters. The Switch 804 routes a single feeder link to one of inputs to the MPA 806. In the exemplary embodiments, the Multiport Power Amp 806 may have 16 inputs.

Considerable flexibility is provided by a simple switching arrangement of multiple Switches 804. In the exemplary embodiments, ninety-nine (99) Switches 804 may be used. In the exemplary embodiments, each Switch 804 has one input and 16 outputs. The switching arrangement of 99 feeds/switches and one of 16 outputs from each Switch 804 provides $16^{99}$ feed arrangements, not necessarily limited to contiguous clusters. In some embodiments, roughly 1000 clusters of 99 feeds may provide full coverage of the Continental United States (see FIG. 10). Each 1:16 switch may be controlled independently, allowing for a flexible selection of feeds per hop. A baseline cluster mapping may be created, for example, on the order of 1000 clusters. Clusters may be redefined during satellite orbit. In some embodiments, the system may select and use feeds (for example, 99 feeds) without using clusters.

The Switch 804 may be implemented at Q-band with FET switches. The control signal 818 for each switch may be provided by a control center (not shown). The control signal 818 could be embedded in the uplink channels or sent via a separate control channel from the processing center to an on-board controller in the satellite.

Figure 9:
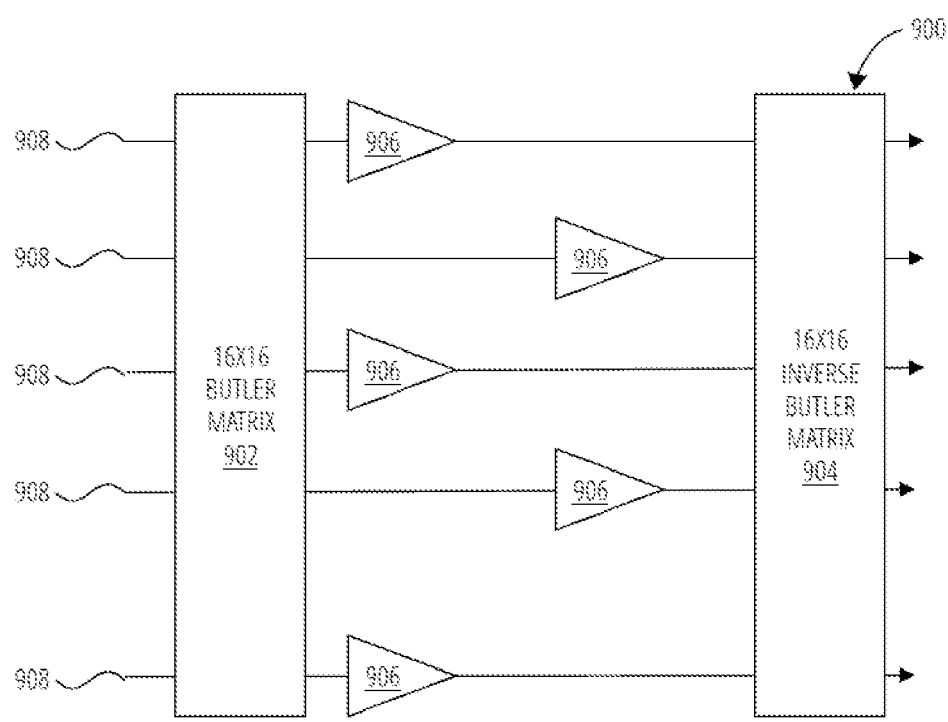
FIG. 9 illustrates an aspect of a multiport power amplifier or SSPA array in accordance with one embodiment.

FIG. 9 illustrates an aspect of a multiport power amplifier or SSPA array in accordance with one embodiment.

A multiport power amplifier 900 may include a 16×16 Butler Matrix 902, a 16×16 Inverse Butler Matrix 904, an SSPA 906, and a feeder link signal 908.

The MPA 900 receives a feeder link signal 908 as an input from the switch on one of its 16 inputs. Only one input is active at any time. The 16×16 Butler Matrix 902 distributes the input signal to the 16 SSPAs 906 at different phases. The SSPAs all amplify their signals. The SSPA outputs are fed to the 16×16 Inverse Butler Matrix 904 that coherently combines the SSPA outputs so that the total energy arrives on the corresponding output port and no energy arrives on any other output. Each output port connects to a satellite antenna feed (not shown), in general through an output filter (not shown). The feed connected to each port is chosen in a way to assure maximum flexibility. Note that 99 feeder links connecting to 16 switch ports provides $16^{99}$ combinations of feeds to be used on any given hop. This arrangement avoids the complexity of connecting each feeder link to every feed and still provides a very large number of possible active feed arrangements. Not all feed arrangements need to be clusters.

Figure 10:
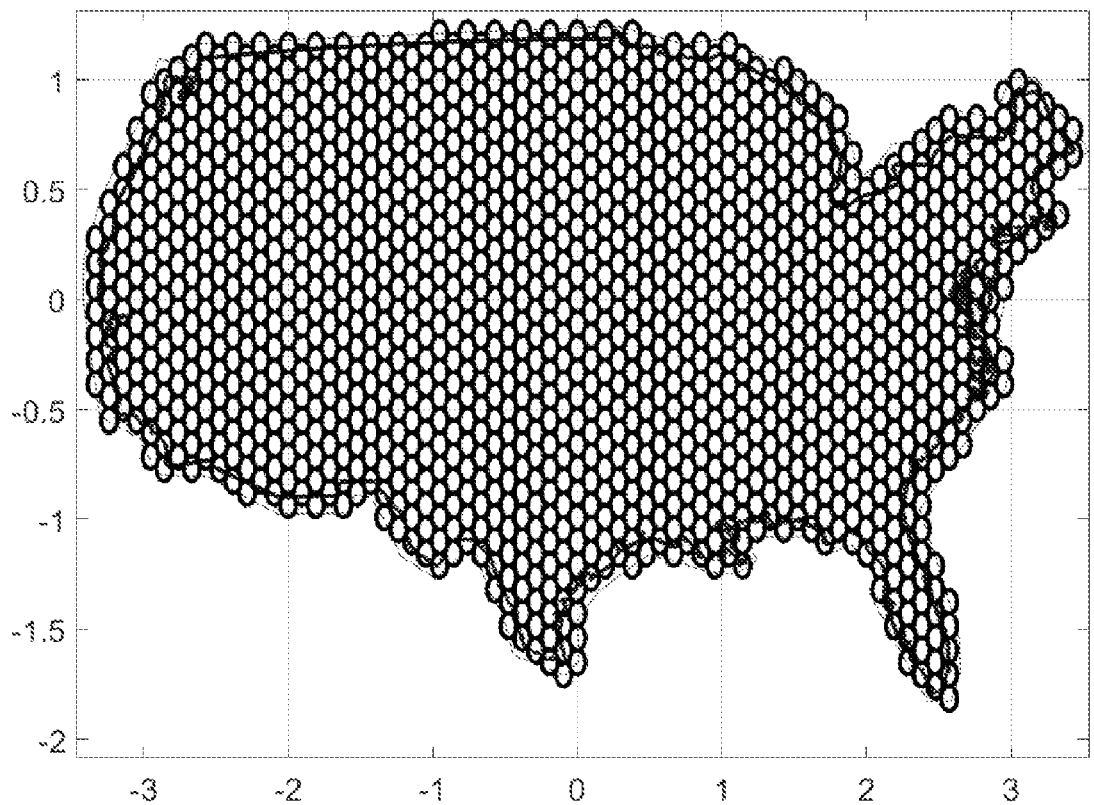
FIG. 10 illustrates clusters to cover the continental United States in exemplary embodiments.

FIG. 10 illustrates clusters to cover the continental United States in exemplary embodiments.

FIG. 10 illustrates secondary feed pattern centers for 1345 feeds on a 5 m antenna with an 8.75 m focal length. Feed diameter is 1.78 cm and the feed is defocused by 14 cm. When the cluster includes 99 feeds, the cluster is roughly 8% of the total feed count of the continental United States.

Feed Array

Figure 11A:
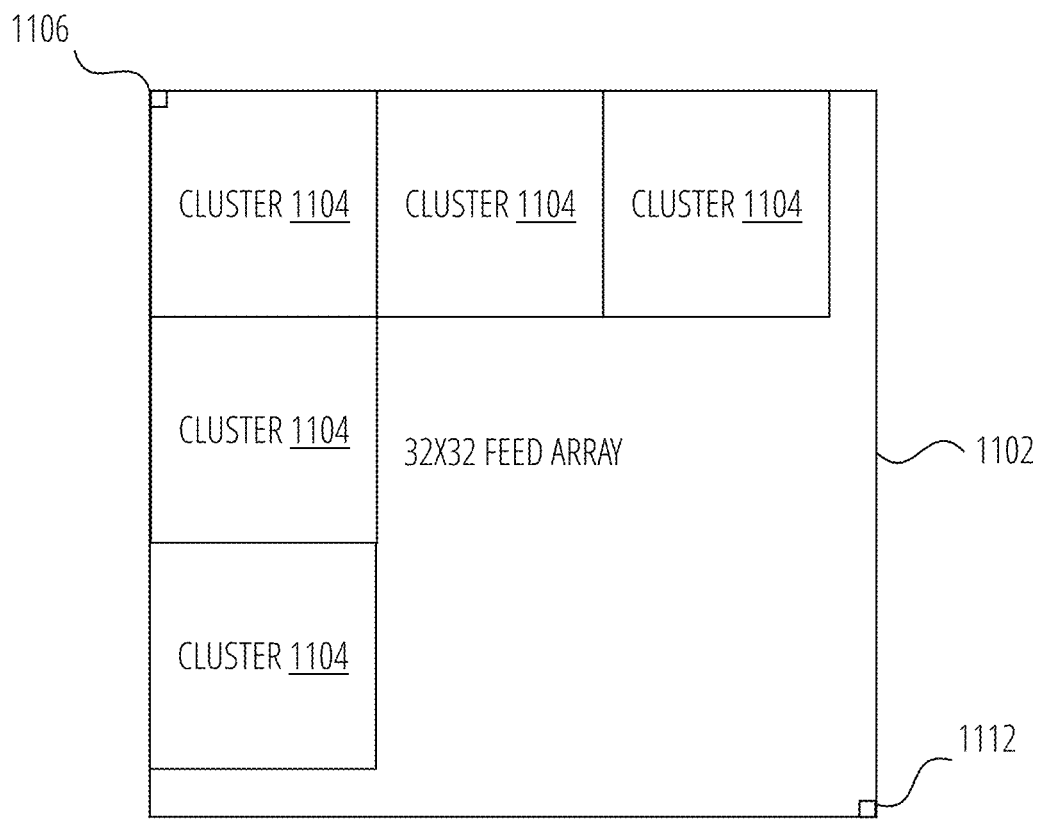
FIG. 11A illustrates an exemplary feed array and cluster according to various embodiments.

FIG. 11A illustrates an exemplary feed array and cluster according to various embodiments.

Figure 11B:
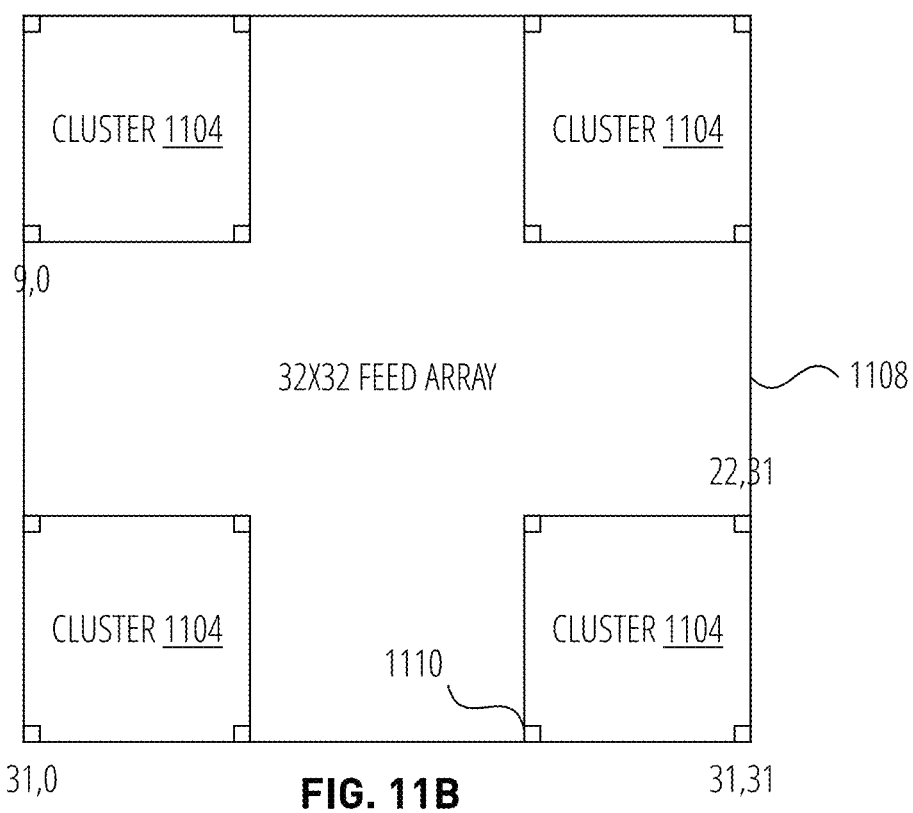
FIG. 11B illustrates an exemplary feed array and cluster in accordance with one embodiment.

FIG. 11A and FIG. 11B illustrate exemplary Feed Arrays, Clustering, and Feeder Links where the feed cluster is assumed to be a square including 100 feeds. A 32×32 Feed array 1102 may be used to distribute up to 1024 feeds. The feeds may be single polarization. In one example, various clusters 1104 may be formed in the 32×32 Feed array 1102. Feed 1106 may be addressed as (0,0) in the 32×32 Feed array 1102. Feed 1112 may be addressed as (31,31) in 32×32 Feed array 1102.

The 10×10 feed clusters 1104 may overlap. Only one cluster may be active at a time per polarization. The other polarization may be completely independent.

FIG. 11B illustrates an exemplary feed array and cluster in accordance with one embodiment.

FIG. 11B illustrates one possible arrangement of square clusters in a square feed array to produce 529 distinct clusters (23×23=529). The cluster 1104 in the upper left corner might be numbered cluster 1, the cluster in the upper right corner might be numbered 23, the cluster in lower left corner might be numbered 506 and the cluster in the lower right corner might be numbered 529.

Figure 11C:
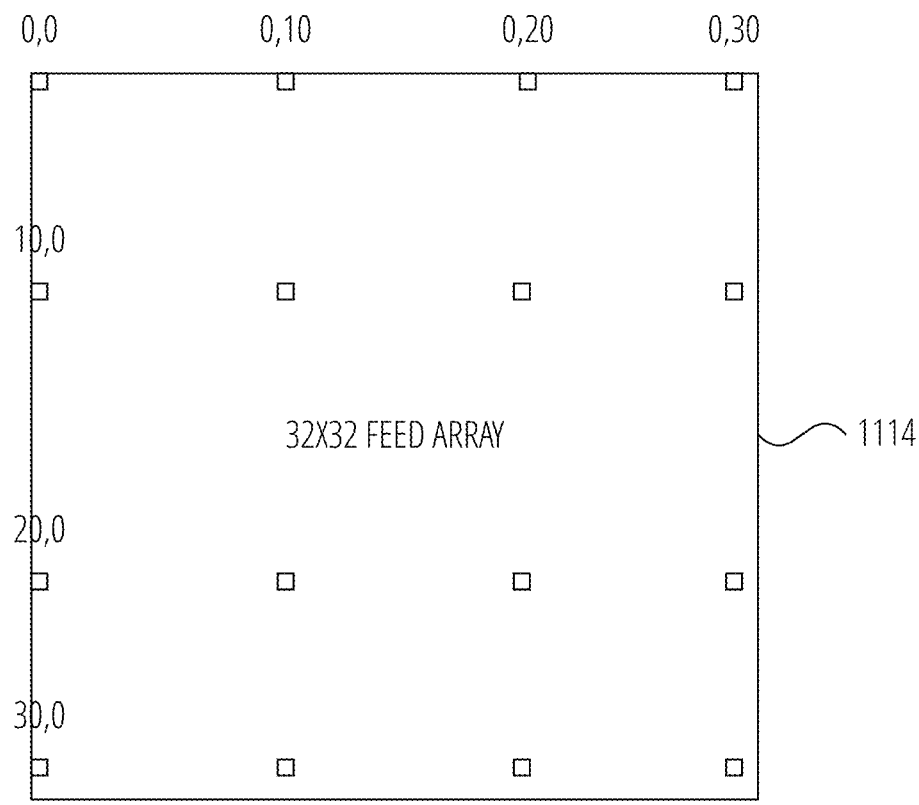
FIG. 11C illustrates an exemplary feed array and cluster in accordance with one embodiment.

FIG. 11C illustrates an exemplary feed array and cluster in accordance with one embodiment.

The next step may assign feeder links to feeds. In this example, one feeder link serves (at most) one of 16 feeds at a time. By assigning feeds to a switch as shown in FIG. 11C, which shows the 16 feeds assigned to one of the switches, each feeder link is associated with the maximum number of clusters. This arrangement maximizes cluster forming flexibility while minimizing the number of feeds associated with a feeder link routing, switching and amplification of the feeds. Each of these feeder links is then mapped to a multiport amplifier.

Calibration

Figure 12:
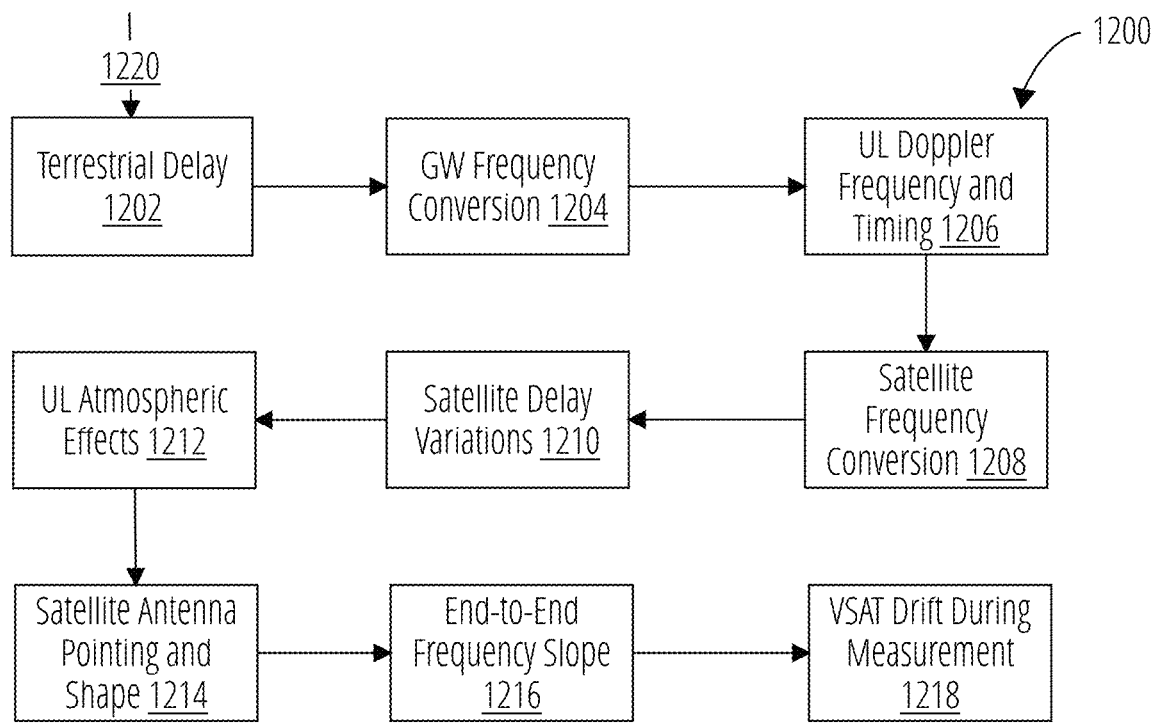
FIG. 12 is a block diagram of contributors to calibration errors according to exemplary embodiments.

FIG. 12 is a block diagram of contributors to calibration errors according to exemplary embodiments.

Calibration is needed to form coherent beams. The system is subject to Doppler frequency and time shifts, frequency drift, phase noise, temperature and other effects on-board as shown in FIG. 12. These effects can reduce the coherency of the multiple feeds contributing to a specific formed beam. Contributors to calibration error 1200 may include errors from a Terrestrial Delay 1202, a GW Frequency Conversion 1204, a UL Doppler Frequency and Timing 1206, a Satellite Frequency Conversion 1208, a Satellite Delay Variations 1210, a UL Atmospheric Effects 1212, a Satellite Antenna Pointing and Shape 1214, an end-to-end frequency slope 1216, a VSAT drift during measurement 1218, and a Feed Excitation 1220. The present teachings use an end-to-end approach.

Figure 13:
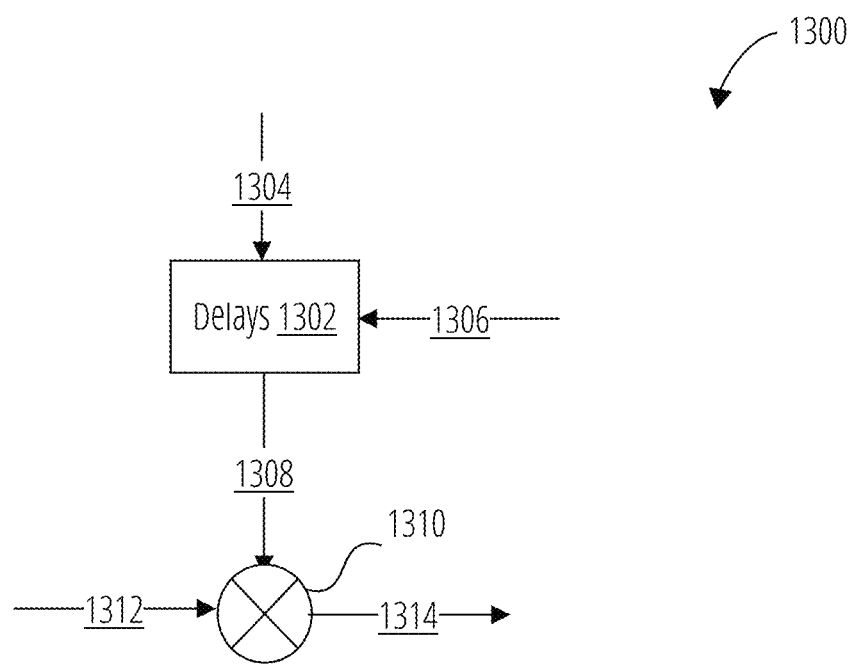
FIG. 13 illustrates an aspect of the subject matter in accordance with one embodiment.

FIG. 13 illustrates processing for calibration errors at a UT according to some embodiments.

In some embodiments, calibration may be done on the satellite using embedded information in the feeder link signals. The Processing Center (PC) may inject per-feed calibration signal after the beam former. This signal carries through the end-to-end system and arrives at the UT. The UT knows the calibration format and correlates a local reference against the received signal as shown in FIG. 13.

A UT 1300 may include a module to account for various Delays 1302 based on a calibration reference 1304 and a symbol timing error 1306 that is output as signal 1308. A combiner 1310 combine signal 1308 with User DL 1312 (possibly after being converted to Q-band) to generate a phase and amplitude error 1314.

In some embodiments, the UT reports per feed measurements of the calibration signals to the processing center. For the reporting, The UT may look at the full expected bandwidth of the user DL 1312 (for example, 2 GHz), independent of the bandwidth received at the UT. Correlation may be performed for each sub-band in the full expected bandwidth. This process may be repeated for 99 feeds for single-polarization UTs, 198 if UTs are dual-polarization. Symbol timing may be dithered until correlation peak is maximized.

The PC receives the relative phase and amplitude 131 reports for each feed on each hop from designated UTs. The PC may determine complex errors for each feed. In some embodiments, the PC may determine a satellite antenna pointing error. The PC may determine appropriate correction factors considering system nonlinearities. The PC may apply phase error compensation and antenna pointing corrections at baseband. The PC may command the satellite ALC to correct amplitude errors.

Beam Forming

In some embodiments, beam forming may be performed using Dirty Paper Coding (DPC). DPC is known to be the sum-rate capacity-achieving technique in Multiuser MIMO downlink. It is an extremely high complexity random nonlinear coding technique primarily used as a theoretical benchmark. Implementation complexity of DPC led to the development of less complex, linear techniques.

In some embodiments, beam forming uses MMSE transmit beam forming. A weighted MMSE (WMMSE) approach is described in co-pending U.S. patent application Ser. No. 16/880,762, filed May 21, 2020, entitled "Beamformer computation taking into account non-homogeneity of offered traffic distribution among cells" incorporated herein in its entirety by reference.

In one embodiment, the throughput of the formed beams pointing at the service areas is matched to the demand from those service areas. This gives additional flexibility in dealing with traffic distribution. For example, if a beam has less data to transmit, the spectral efficiency (SE) may be reduced at that beam by allowing more interference at that beam. This may increase the SE at beams with more data to transmit. One possible approach is to modify MMSE beamformer by including a weight matrix on the MSE. In other words, error for the beams with less traffic can be weighted less in comparison to beams with more traffic.

Scheduling

According to various embodiments, scheduling may be used to determine an illumination schedule and servicing of data queues as only subsets of feeds form clusters of beams are active within each transmission interval. In some embodiments, scheduling may proceed by first selecting a cluster of beam centers based on traffic loading, and then selecting a set of feeds to be used to form those beams. Clustering makes it harder to manage extreme peak-to-average traffic distributions, because servicing the high traffic queues creates trouble serving the low traffic queues with minimal latency. The system modeling uses "back pressure" to control traffic flow. Several scheduling variations such as pure clustering or split clustering may be used.

For pure clustering:
A single cluster is formed
A set of feeds used during a scheduling interval may be more or less contiguous, and beams formed using that set of feeds are in the general area illuminated by that set of feeds
In one embodiment, the cluster may be selected by first selecting a beam with the deepest queue and then adding beams that can be served by contiguous feeds of the antenna
Alternatively, the cluster may be selected by total traffic in queues within a cluster region
In one embodiment, beams may be selected on a fixed reuse pattern
In some embodiments, beams may be selected using a fixed or randomized distance from previously selected beams
For split clustering
A set of feeds may be selected forming a single cluster as for pure clustering, and in addition another subset or subsets may be located elsewhere
This will allow flexibility to place additional beams (outside of the cluster) to address high priority or latency sensitive traffic
Contiguous feeds treated as above
Split feeds may be a number of isolated feeds or a number of small clusters
Beams may be selected as above or according to the age of packets in the service area queues
Any service area with the secondary pattern of the isolated feed may be selected if the isolated feeds are far enough apart.

Figure 14:
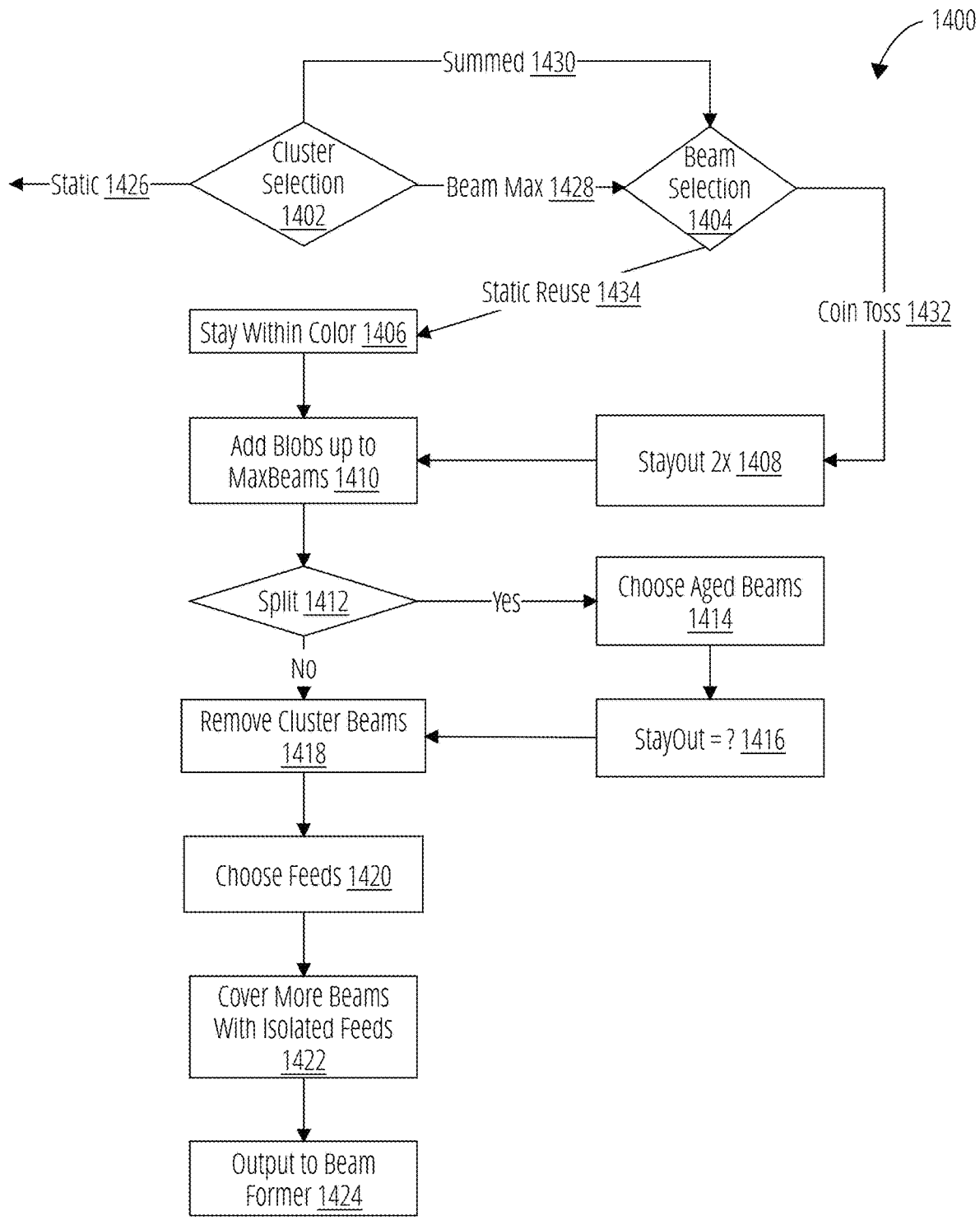
FIG. 14 is an exemplary scheduling flow chart according to one embodiment.

FIG. 14 is an exemplary scheduling flow chart according to one embodiment.

FIG. 14 illustrates a Scheduler 1400 including a Cluster selection 1402, a Beam selection 1404 and a split 1412. A cluster may be selected (1402) by finding the service area with the most traffic in its queue. In one embodiment, the area around a cluster center may be examined for total traffic. The criteria may be more than just traffic; it could include a latency metric and/or priority metric. After the cluster location is selected, the service areas within the cluster are chosen. These areas may be constrained to lie on a fixed reuse pattern (static reuse 1434, or they may be selected using a randomized reuse pattern referred to as "coin toss" (coin toss 1432). Beam selection 1404 may be constrained to be within some distance of the cluster center.

A maximum number of beams (beam max 1428) is allowed as a system parameter. If the selection method as described above results in fewer than that maximum being chosen (summed 1430), the cluster may be extended. This is typically the case for odd-shaped areas such as Florida.

The flow chart then indicates that SPLITs 1412 may be used. The idea is that the clusters will tend to favor high traffic rather than latency. The SPLIT 1412 may chose an additional set of service areas that have traffic that have been delayed (choose aged beams 1414). For example, 18 feeds may be removed from the cluster (Remove cluster beams 1418) and dedicated to addressing the latency traffic. These would be individual feeds, or they could be small groups of feeds (choose feeds 1420). In some embodiments, Scheduler 1400 may cover more beams with isolated feeds 1422. The 1400 may then output the selected cluster, beams and feeds to the GBBF (1424).

Soft Diversity

The GBBF approach allows the use of soft diversity on the feeder link uplinks from the Gateway RFTs. This is highly preferred to a hard diversity. Hard diversity requires switching hardware on the satellite, but soft diversity does not require any switching. Soft diversity can make use of the entire feeder link bandwidth during clear sky operation, whereas hard diversity cannot use the bandwidth from the diverse gateways. The disadvantage of soft diversity is that some performance is lost when the feeder links fade due to weather. This \effect has been modeled.

Figures 15, 16:
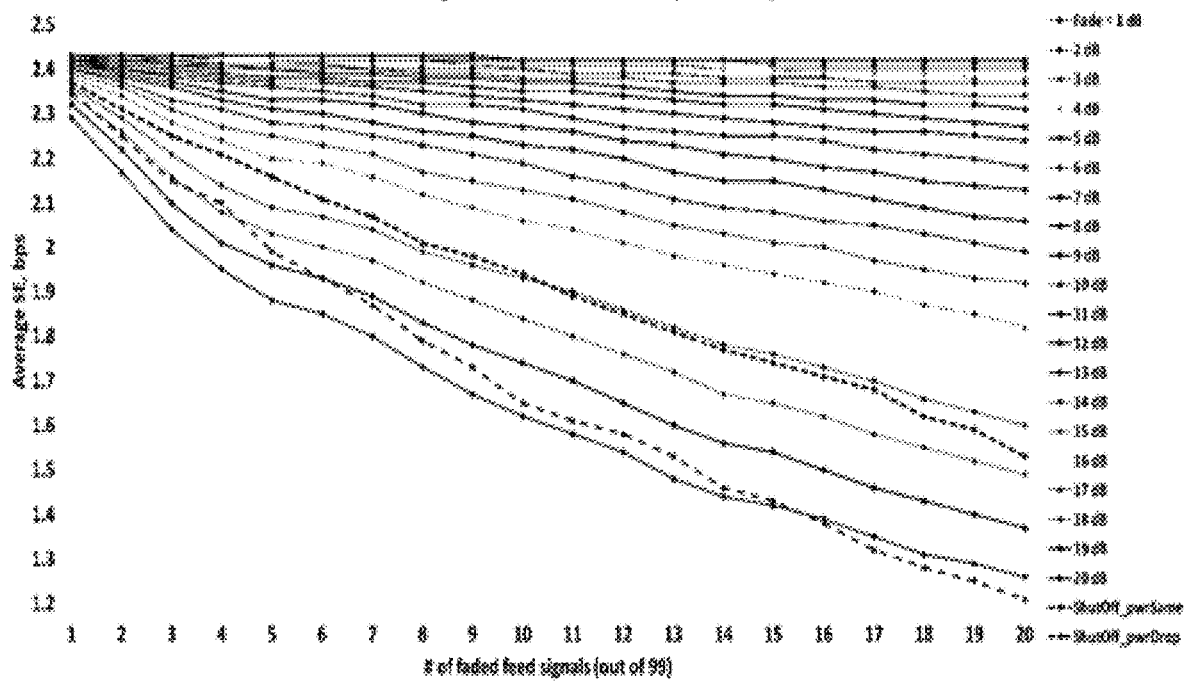
FIG. 15 illustrates an aspect of the subject matter in accordance with one embodiment.
FIG. 16 illustrates an aspect of the subject matter in accordance with one embodiment.

Select N random feeds out of 99, N ranges from 1 to 20
Select a UL (feeder link) deterministic fade depth X in the range 1-20 dB applied to N feeds
In the absence of UL fade, UL C/N=20.52 dB, C/I=25.1 dB and NPR=25.0 dB
The above three components combine to a C/(I+N)=18.2 dB (no fade)
X dB fade reduces the UL RX signal power, reducing both UL C/N and C/I by X dB
NPR=25.0 dB is kept fixed
Overall effect of C/N, C/I and NPR, i.e., C/N+I reduces as shown in FIG. 15
This results in an increase in the noise level TX from that feed
Gain is increased to restore the faded feed signal to its desired level
So, noise level is higher for the faded feeds on the DL TX
The increased noise level degrades spectral efficiency (SE) as shown in FIG. 16.

Figure 17:
FIG. 17 illustrates a method for beamforming according to various embodiments.

FIG. 17 illustrates a method for beamforming according to various embodiments.

In operation 1702, method 1700 provides a coverage area including service areas and data streams for each of the service areas. The service areas may tesselate the coverage area. In operation 1704, method 1700 schedules N data streams of the data streams. In operation 1706, method 1700 selects a cluster of M feeds. In operation 1708, method 1700 computes, with a GBBF processor (ground based beam former), M×N weights. In operation 1710, method 1700 generates M feed excitations by distributing the N data streams per the M×N weights. In operation 1712, method 1700 switches an array to transfer a respective one of the M feed excitations to a respective one of the M feeds. In operation 1714, method 1700 beamforms, with an antenna comprising the cluster, N beams.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for beamforming comprising:
providing an antenna comprising feeds, a coverage area comprising service areas and data streams for each of the service areas;
scheduling N data streams of the data streams;
selecting a cluster of M feeds from the feeds;
computing, with a GBBF processor (ground based beam former), M×N weights;
generating M feed excitations by distributing the N data streams per the M×N weights;
switching an array to transfer a respective one of the M feed excitations to a respective one of the M feeds; and
beamforming, with the M feeds of the antenna, N beams,
wherein the N beams are each focused on a respective service area of each of the N data streams,
the M×N weights improve the transmitting into the respective service area of each of the N data streams, and
at least one of the N beams comprises a portion of a plurality of the M feed excitations.

2. The method of claim 1, wherein the antenna comprises an array-fed reflector comprising the feeds, and a count of the feeds is greater than M.

3. The method of claim 1, wherein M is greater than N.

4. The method of claim 1, wherein the M×N weights are weighted to account for a predicted offered traffic demand based on a usage pattern for each of the N data streams.

5. The method of claim 1, wherein the scheduling, the selecting, the generating, the switching and the beamforming are performed per an integral multiple of a transmission interval.

6. The method of claim 1, wherein the scheduling moves the N beams over a breadth of the coverage area over a plurality of transmission intervals.

7. The method of claim 1, wherein the selecting comprises a static mapping of clusters to a subset of service areas, wherein each subset comprises N service areas and each subset comprises uniformly spaced service areas.

8. The method of claim 1, wherein the selecting selects feeds associated with a respective service area of one or more of the N data streams.

9. The method of claim 1, further comprising forming the N data streams by encoding, modulating and framing each of the N data streams.

10. The method of claim 1, further comprising sending the M feed excitations to a satellite, wherein the switching and the beamforming are performed in the satellite, and the beamforming comprises transmitting the N beams from the antenna.

11. The method of claim 1, further comprising receiving the M feed excitations from a satellite, wherein the switching and the beamforming are performed in the satellite, and the beamforming comprises receiving the N beams from the antenna.

12. The method of claim 1, wherein the M×N weights provide interference suppression so that a same frequency and polarization is used for the M feeds in the cluster.

13. A system to beamform comprising:
an antenna comprising feeds;
a coverage area comprising service areas and data streams for each of the service areas;
a scheduler to schedule N data streams of the data streams and to select a cluster of M feeds from the feeds;
a GBBF processor (ground based beam former), to compute M×N weights;
a Complex Weight Multiplier to generate M feed excitations that distribute the N data streams per the M×N weights; and
a switch to transfer a respective one of the M feed excitations to a respective one of the M feeds,
wherein N beams are beamformed with the M feeds of the antenna,
the N beams are each focused on a respective service area of each of the N data streams,
the M×N weights improve the transmitting into the respective service area of each of the N data streams, and
at least one of the N beams comprises a portion of a plurality of the M feed excitations.

14. The system of claim 13, wherein the antenna comprises an array-fed reflector comprising more than the M feeds and M is greater than N.

15. The system of claim 13, wherein the M×N weights are weighted to account for a predicted offered traffic demand based on usage patterns for each of the N data streams.

16. The system of claim 13, wherein the Scheduler moves the N beams over a breadth of the coverage area over a plurality of transmission intervals.

17. The system of claim 13, wherein the Scheduler comprises a static mapping of clusters to a subset of service areas, wherein each subset comprises N service areas and each subset comprises uniformly spaced service areas.

18. The system of claim 13, wherein the Scheduler selects feeds associated with a respective service area of one or more of the N data streams.

19. The system of claim 13, further comprising: a satellite; and a RF gateway to transmit the M feed excitations to the satellite, wherein the switch and the antenna are disposed in the satellite, and the beamformer transmits the N beams from the antenna.

20. The system of claim 13, a satellite; and a RF gateway to receive the M feed excitations from the satellite, wherein the switch and the antenna are disposed in the satellite, and the beamformer receives the N beams from the antenna.

* * * * *